(No Model.)
W. G. MELVIN.
COFFEE POT.
No. 599,513.
Patented Feb. 22, 1898.
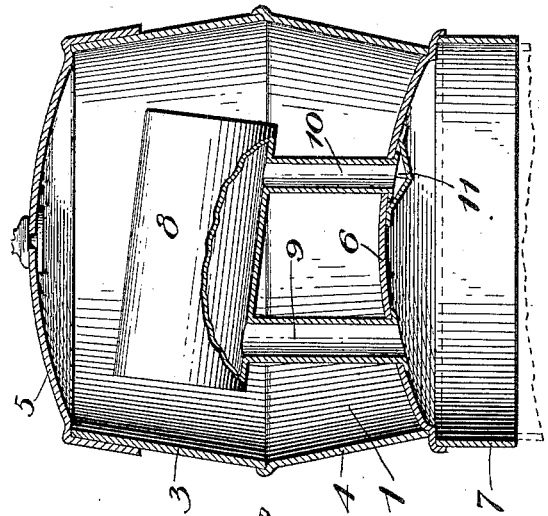
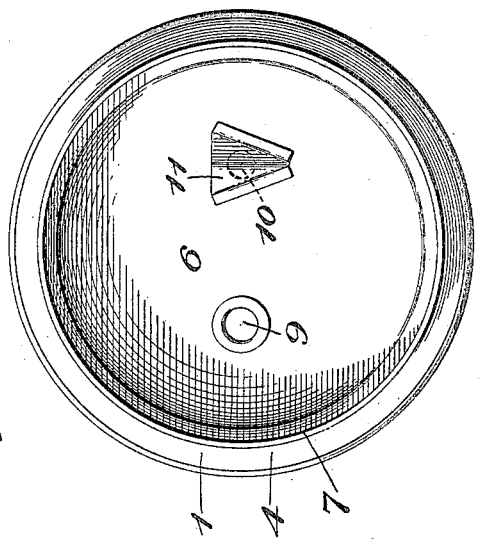
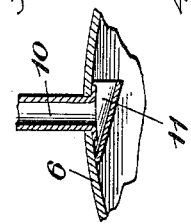
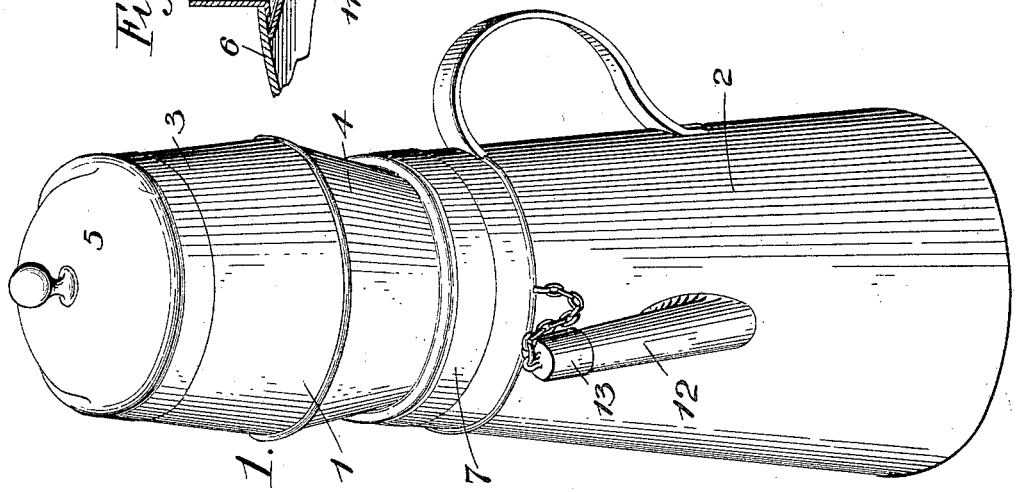
Witnesses
Inventor
Wythe G. Melvin.
By his Attorneys,

UNITED STATES PATENT OFFICE.

WYTHE GRARA MELVIN, OF NEW RIVER DEPOT, VIRGINIA, ASSIGNOR OF ONE-HALF TO W. N. GILLIAM AND W. C. HARLESS, OF SAME PLACE.

COFFEE-POT.

SPECIFICATION forming part of Letters Patent No. 599,513, dated February 22, 1898.

Application filed September 30, 1897. Serial No. 653,625. (No model.)

*To all whom it may concern:*

Be it known that I, WYTHE GRARA MELVIN, a citizen of the United States, residing at New River Depot, in the county of Pulaski and State of Virginia, have invented a new and useful Coffee-Pot, of which the following is a specification.

The invention relates to improvements in coffee-pots.

The object of the present invention is to provide for coffee-pots a simple and inexpensive device designed to be mounted on an ordinary coffee-pot without necessitating any alteration in the construction thereof and adapted to condense the steam arising from the contents of a coffee-pot and conduct such condensed vapor back into the latter and thereby retain all the aroma of the coffee and at the same time operate to settle the same.

The invention consists in the construction and novel combination and arrangement of parts, as hereinafter fully described, illustrated in the accompanying drawings, and pointed out in the claims hereto appended.

In the drawings, Figure 1 is a perspective view of a coffee-pot provided with a condenser constructed in accordance with this invention. Fig. 2 is a vertical sectional view of the condenser. Fig. 3 is a reverse plan view of the same. Fig. 4 is a detail sectional view of the lower portion of the discharge-tube of the condenser.

Like numerals of reference designate corresponding parts in all the figures of the drawings.

1 designates a substantially cylindrical casing designed to be mounted upon the top of a coffee-pot 2 and provided with reversely-tapered upper and lower portions 3 and 4, forming a slight bulge midway between the top and bottom of the casing. The cover 5 of the coffee-pot is adapted to form the cover of the casing, as illustrated in the accompanying drawings, and the bottom 6 of the casing is concavo-convex, presenting a lower concave face and forming a dome. The casing is provided at its bottom with a depending annular flange 7, which fits the upper edges of the coffee-pot similar to the cover.

Within the casing is mounted a slightly-inclined condensing drum or cylinder 8, supported by tubes 9 and 10 and designed to be surrounded by cold water placed within the outer casing 1. The outer casing extends sufficiently above the inner drum or casing 8 to permit the latter to be entirely submerged. The tubes 9 and 10 extend through the bottom of the casing 1. The tube 9, which connects with the upper end of the inner casing or drum 8, constitutes a steam-inlet, and the other pipe permits the condensed vapor to drain back into the coffee-pot. The lower end of the discharge-tube 10 is covered by a tapering plate 11, secured to the lower face of the bottom and depressed centrally to form a V-shaped gutter or lip, as clearly illustrated in Fig. 2 of the drawings. This prevents the steam from ascending the tube 10 and enables the latter to operate as a discharge-pipe.

In the operation of the device the casing is filled with cold water, and the steam arising from the contents of the coffee-pot passes up through the inlet-tube 9 and enters the inner casing or drum 8 and is there condensed by the cold water within the outer casing. The condensed vapor is discharged through the tube 10 and returns to the coffee-pot, serving to settle the coffee. The device performs the double function of retaining the aroma of the coffee and settling the latter.

The spout 12 of the coffee-pot is provided with a cap 13, which prevents steam and the aroma of the coffee from escaping at that point.

The invention has the following advantages: The device is simple and comparatively inexpensive in construction and is adapted to be readily applied to an ordinary coffee-pot. It is adapted to condense the vapors arising from the contents of the coffee-pot and prevent the escape of the aroma, and the condensed vapors returning to the coffee-pot serve to settle the coffee. The coffee is settled without the addition of cold water to it, and it is not weakened by the settling operation. The cold water within the outer casing of the condenser does not affect the strength of the coffee, and the device may be applied to the coffee-pot at any time while coffee is being made.

Changes in the form, proportion, and minor details of construction may be resorted to without departing from the spirit or sacrificing any of the advantages of this invention.

What I claim is—

1. In a device of the class described, the combination with a coffee-pot, of a condensing device mounted thereon and comprising an outer casing having a concavo-convex bottom, presenting a lower concave face, a cover, tubes mounted on the bottom of the outer casing and disposed substantially vertically, and an inner casing or drum disposed at a slight inclination and supported by the tubes, said drum or casing being of greater diameter than the tubes, substantially as described.

2. In a device of the class described, the combination with a coffee-pot, of a condensing device mounted thereon and comprising an outer casing provided with a cover and having a curved bottom presenting a lower concave face, a condensing casing or drum arranged within the outer casing at a slight inclination, tubes supporting the same and arranged near the ends thereof, and a plate located beneath one of the tubes and forming a gutter or lip, substantially as and for the purpose described.

In testimony that I claim the foregoing as my own I have hereto affixed my signature in the presence of two witnesses.

WYTHE GRARA MELVIN.

Witnesses:
E. G. CALDWELL,
M. M. CALDWELL.